US008620968B2

(12) United States Patent
Atasu et al.

(10) Patent No.: US 8,620,968 B2
(45) Date of Patent: *Dec. 31, 2013

(54) DETERMINATION AND HANDLING OF SUBEXPRESSION OVERLAPS IN REGULAR EXPRESSION DECOMPOSTIONS

(75) Inventors: Kubilay Atasu, Zurich (CH); Florian Doerfler, Zurich (CH); Christoph Hagleitner, Zurich (CH); Jan Van Lunteren, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/571,431

(22) Filed: Aug. 10, 2012

(65) Prior Publication Data

US 2013/0262493 A1    Oct. 3, 2013

Related U.S. Application Data

(63) Continuation of application No. 13/432,252, filed on Mar. 28, 2012.

(51) Int. Cl.
*G06F 17/30* (2006.01)

(52) U.S. Cl.
USPC ........................ 707/803; 707/601; 707/758

(58) Field of Classification Search
USPC ...................................... 707/601, 758, 803
See application file for complete search history.

(56) References Cited

U.S. PATENT DOCUMENTS

| 6,108,676 | A * | 8/2000 | Nakatsuyama ............... 715/210 |
| 7,085,918 | B2 * | 8/2006 | Sharangpani et al. ........ 712/217 |
| 7,689,530 | B1 * | 3/2010 | Williams, Jr. et al. ........... 706/62 |
| 2005/0012521 | A1 | 1/2005 | Sharangpani et al. |
| 2007/0226362 | A1 * | 9/2007 | Johnson et al. ............... 709/230 |

OTHER PUBLICATIONS

H. Franke et al., "Introduction to the Wire-Speed Processor and Architecture," Copyright 2010 International Business Machines Corporation, IBM J. Res. & Dev., vol. 54, No. 1, Paper 3, Jan./Feb. 2010, pp. 3:1-3:11.
J. Van Lunteren, "High-Performance Pattern-Matching for Intrusion Detection," copyright 2006 IEEE, 13 pages.
R. Krishnamurthy et al., "System T: A System for Declarative Information Extraction," SIGMOD Record, Dec. 2008, vol. 37, No. 4, pp. 7-13.

(Continued)

*Primary Examiner* — John Breene
*Assistant Examiner* — Andalib Lodhi
(74) *Attorney, Agent, or Firm* — Cantor Colburn LLP; Daniel Morris (57) ABSTRACT

A computer program product comprising a computer readable storage medium containing computer code that, when executed by a computer, implements a method for transforming a finite state automaton (FSA) of a regular expression, wherein the method includes determining, by a computer, a first subexpression $R_1$ and a second subexpression $R_2$ in the regular expression; calculating an overlap FSA, the overlap FSA configured to determine the existence of a partial overlap or a full overlap between the first subexpression $R_1$ and the second subexpression $R_2$; determining whether the overlap FSA has an accepting state; and in the event the overlap FSA is determined not to have an accepting state, determining that the transformation of the regular expression is safe, and constructing a transformed FSA of the regular expression comprising a first FSA for the first subexpression $R_1$ and a second FSA for the second subexpression $R_2$.

20 Claims, 6 Drawing Sheets

(56) References Cited

OTHER PUBLICATIONS

R. Smith et al., "Deflating the Big Bang: Fast and Scalable Deep Packet Inspection with Extended Finite Automata," SIGCOMM 2008, Aug. 17-22, 2008, Seattle, Washington, USA, Copyright 2008 ACM, pp. 207-218.

S. Kumar et al., "Curing Regular Expressions Matching Algorithms from Insomnia, Amnesia, and Acalulia," Apr. 27, 2007, Department of Computer Science and Engineering—Washington University, St. Louis, MO, 17 pages.

* cited by examiner

DETERMINATION AND HANDLING OF SUBEXPRESSION OVERLAPS IN REGULAR EXPRESSION DECOMPOSTIONS

CROSS-REFERENCE TO RELATED APPLICATION

This application is a continuation of U.S. application Ser. No. 13/432,252, filed on Mar. 28, 2012, the disclosure of which is incorporated by reference herein in its entirety.

BACKGROUND

This disclosure relates generally to the field of finite state automatons (FSAs), and more particularly to identifying and handling subexpression overlaps in FSA transformations that are associated with regular expression decompositions.

Figure 1:
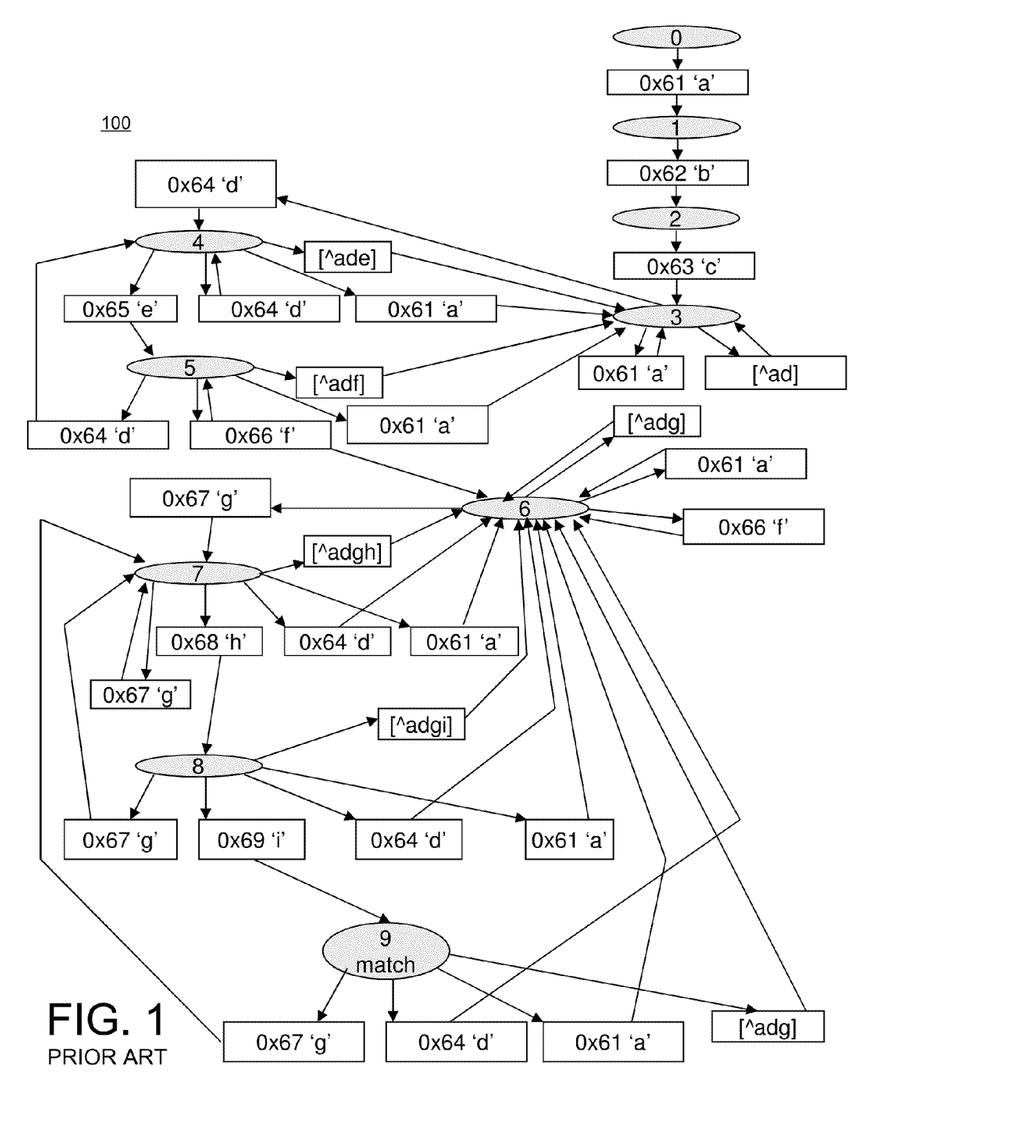
FIG. 1 illustrates an example of a FSA.

Packet content scanning is an essential part of network security and monitoring applications. Intrusion detection systems such as Snort (http://www.snort.org) rely heavily on regular expressions to express increasingly complex attack patterns. A typical way of matching regular expressions in a stream of input characters is by simulating the input on a Finite State Automaton (FSA), which may be a nondeterministic FSA (NFA) or a deterministic FSA (DFA), compiled from the regular expression. For example, FIG. 1 shows an example of a FSA 100 comprising a DFA that detects the regular expression "abc.*def*ghi" in an input data stream. The regular expression "abc.*def*ghi" is in perl compatible regular expression (PCRE) format. The FSA 100 is modeled as a directed graph. The FSA states are shown in circles, the state transitions are shown using directed edges, and the set of input characters resulting in the transitions (i.e., the transition rules) are given in the rectangular boxes. The initial state of the FSA is labeled as state 0, with intermediate states numbered 1 to 8, leading up to a match of the regular expression at state number 9. The plurality of transition rules governs transitions between the states. Note that if the regular expression is non-anchored, additional transitions that point to state 0 and state 1 would be needed in FIG. 1. Similarly, if the regular expression is anchored, there has to be an explicit invalid state in the FSA and additional transitions pointing to the invalid state for state/input combinations without a valid next state.

Figure 2:
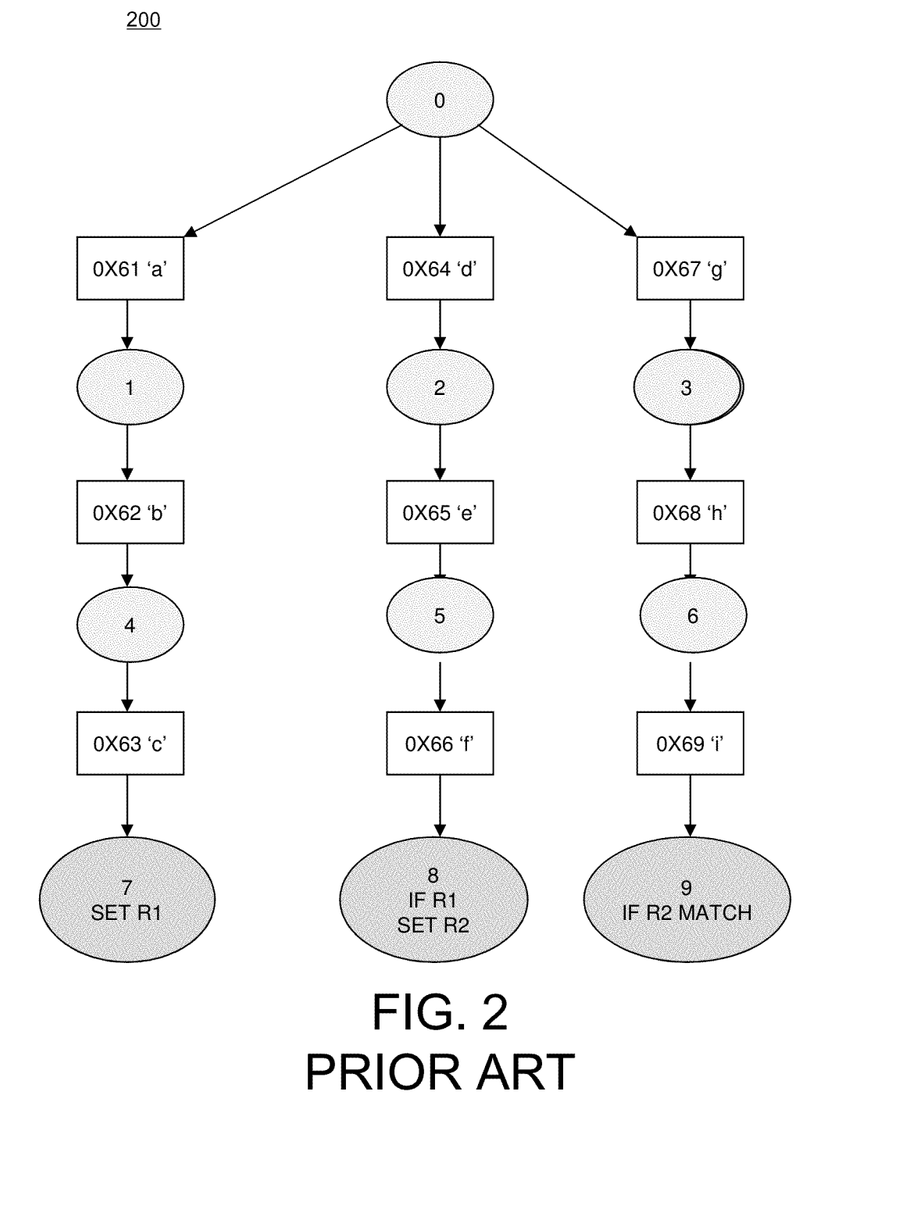
FIG. 2 illustrates an example of a FSA that is a transformation of the FSA of FIG. 1.

FIG. 2 shows an example of a FSA 200 comprising a DFA that is a transformation of the FSA 100 that was shown in FIG. 1. FSA 200 also detects the regular expression "abc.*def*ghi". If the original regular expression is non-anchored, it may be decomposed, or split, into independent subexpressions "abc", "def", and "ghi", allowing the transformed DFA 200 to match each of the subexpressions independently. Starting at state 0 (zero), the leftmost column of states and transition rules detects the presence of "abc" in the input stream by proceeding through states 1 and 4 to state 7. At state 7, a first register is set indicating that "abc" was matched. Then, proceeding through states 2 and 5 to state 8 detects a match of "def". In state 8, the first register is tested, and if the first register is set, then a second register is set indicating the presence of "abc.*def". Lastly, proceeding through states 3 and 6 to state 9 detects a match of "ghi", and, in state 9, the second register is tested. If the second register is set, then a match of the whole regular expression "abc.*def.*ghi" is indicated. The transformed FSA 200 may be implemented in three parallel DFAs with a post-processor. The first and second registers may be 1-bit registers located in the post-processor. The transformed FSA 200 of FIG. 2 includes a significantly smaller number of state transitions as compared to the initial FSA 100 of FIG. 1 while implementing the same functionality, reducing the amount of memory needed to store the FSA 200.

BRIEF SUMMARY

In one aspect, a computer program product comprising a computer readable storage medium containing computer code that, when executed by a computer, implements a method for transforming a FSA of a regular expression, wherein the method includes determining a first subexpression $R_1$ and a second subexpression $R_2$ in the regular expression; calculating an overlap FSA, the overlap FSA configured to determine the existence of a partial overlap or a full overlap between the first subexpression $R_1$ and the second subexpression $R_2$; determining whether the overlap FSA has an accepting state; and in the event the overlap FSA is determined not to have an accepting state, determining that the transformation of the regular expression is safe, and constructing a transformed FSA of the regular expression comprising a first FSA for the first subexpression $R_1$ and a second FSA for the second subexpression $R_2$.

In another aspect, a computer system for transforming a FSA of a regular expression is configured to determine a first subexpression $R_1$ and a second subexpression $R_2$ in the regular expression; calculate an overlap FSA, the overlap FSA configured to determine the existence of a partial overlap or a full overlap between the first subexpression $R_1$ and the second subexpression $R_2$; determine whether the overlap FSA has an accepting state; and in the event the overlap FSA is determined not to have an accepting state, determine that the transformation of the regular expression is safe, and construct a transformed FSA of the regular expression comprising a first FSA for the first subexpression $R_1$ and a second FSA for the second subexpression $R_2$.

Additional features are realized through the techniques of the present exemplary embodiment. Other embodiments are described in detail herein and are considered a part of what is claimed. For a better understanding of the features of the exemplary embodiment, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Embodiments of systems and methods for determination and handling of subexpression overlap for FSA transformations are provided, with exemplary embodiments being discussed below in detail. Overlap between the subexpressions that are matched by an FSA transformation may lead to false positive results for certain input strings. For example, a transformation of a FSA that matches a partially overlapping regular expression "abc.*cde" may be problematic. A transformation this FSA may match the subexpressions "abc" and "cde" independently. However, setting a register whenever "abc" matches and then reporting a match whenever "cde" matches only if the register is set, such as was described above with respect to FSA 200 of FIG. 2, does not preserve the meaning of the regular expression "abc.*cde", as a false positive match would be given for an input string "abcde". However, a FSA transformation correctly matches overlapping subexpressions may be achieved by applying further transformations to the FSA, making use of more complex instructions, and a counter. Partial and full overlap between subexpressions may be handled in various embodiments by computing the existence and degree of overlap between the subexpressions and applying post-processing techniques which eliminate the false positives by making use of the computed overlaps.

Various types of overlaps that occur in regular expression transformations, or decompositions, may be identified, and overlap FSA(s) may be constructed that can recognize such overlaps. Additionally, the overlap FSA(s) may be used to detect and eliminate false positives that are associated with regular expression transformations. Embodiments of systems and methods for determination and handling of subexpression overlap for FSA transformations may be integrated into any appropriate computer hardware, for example a pattern matching engine of a Power Edge of Network Processor (PowerEN) from International Business Machines, Inc. (IBM), and its regular expression (Regex) compiler. The FSAs that are transformed and constructed may be either NFAs or DFAs in various embodiments.

Full and partial overlap determination and handing for FSA transformation is discussed with respect to a general regular expression of the type $R_1.*R_2$, comprising subexpressions $R_1$ and $R_2$. $R_1$ and $R_2$ may be any appropriate simple string or regular expression in various embodiments. The regular expression $R_1.*R_2$ defines a regular language that contains the set of all strings that start with a string that belongs to the language defined by $R_1$, followed by an arbitrary number of characters, and ending with a string that belongs to the language defined by $R_2$. Transformation of $R_1$ and $R_2$, as discussed below, may be performed by any appropriate FSA transformation technique, for example the techniques described above with respect to FIG. 2. Various operations, including concatenation, union, intersection, and difference operations are used to determine and handle partial and full overlap between $R_1$ and $R_2$. In the following discussion, an explicit symbol for concatenation is not used, but $\cup$, $\cap$, and $\setminus$ symbols are used to denote, respectively, union, intersection, and difference operations.

Figure 3:
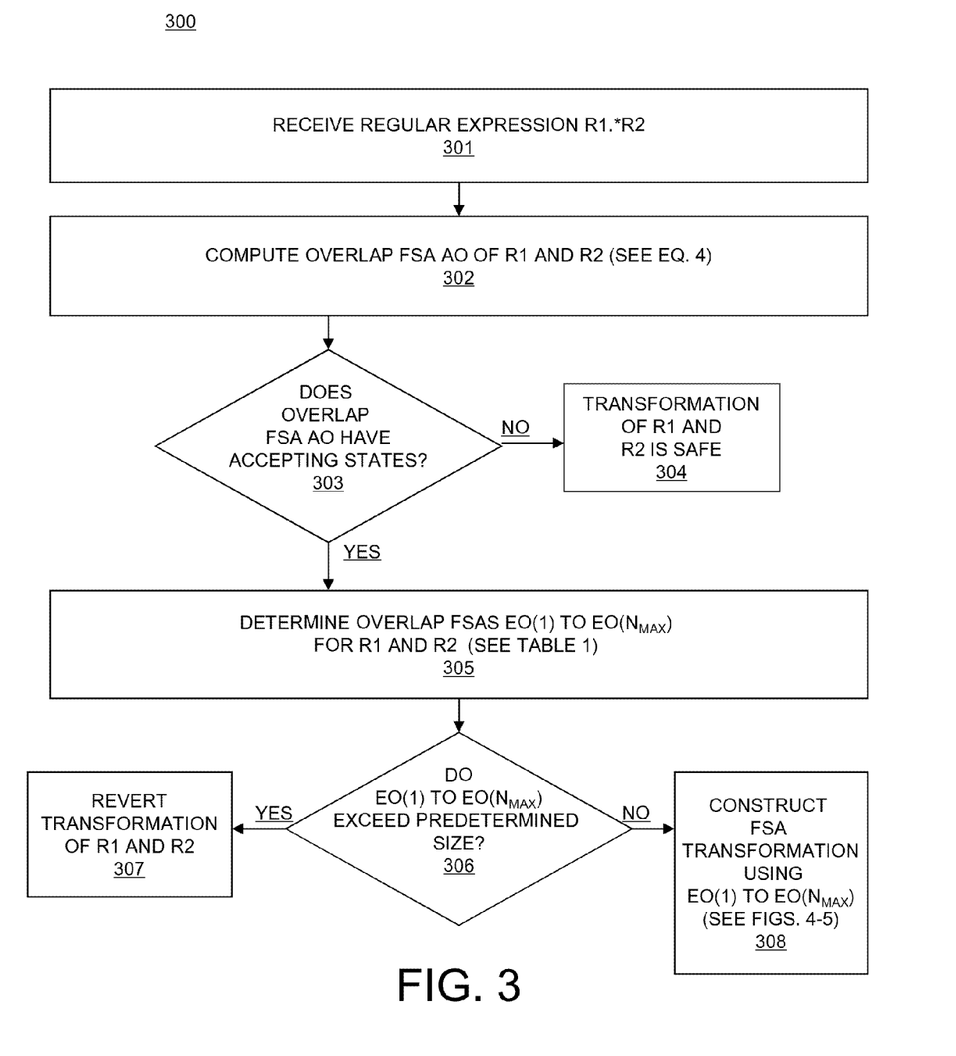
FIG. 3 illustrates a flowchart of an embodiment of a method of determination of subexpression overlap for a FSA transformation.

FIG. 3 illustrates a flowchart of an embodiment of a method 300 of determination of subexpression overlap for a FSA transformation. First, in block 301 of FIG. 3, a regular expression to be matched in an input stream is provided. The regular expression is of the type $R_1.*R_2$, containing subexpressions $R_1$ and $R_2$. Next, in block 302 of method 300, an initial overlap FSA, referred to as all overlaps, or AO, for $R_1$ and $R_2$ is determined. The overlap FSA AO may be determined based on partial overlap (PO) and full overlap (FO) definitions. All of the input strings that result in a partial overlap between $R_1$ and $R_2$ are defined as follows:

$$PO=(R_1.*\cap.*R_2)\setminus(R_1.*R_2) \quad (EQ. 1).$$

Note that the language defined by $(R_1.*\cap.*R_2)$ contains all the strings that start with a string that belongs to the language defined by $R_1$ and that end with a string that belongs to the language defined by $R_2$. The set of all strings that result in partial overlaps (i.e., the language PO) is the difference between the language defined by $(R_1.*\cap.*R_2)$ and the language defined by $R_1.*R_2$. All the strings that result in a full overlap between $R_1$ and $R_2$ are given by:

$$FO=.*R_1.*\cap R_2 \quad (EQ. 2).$$

FO contains the strings that belong to the language defined by $R_2$ and that contain at least one substring that belongs to the language defined by $R_1$.

The overlap FSA AO is computed based on EQ. 1 and EQ. 2. FSA AO that gives both partial and full overlaps between $R_1$ and $R_2$ may be formulated based on PO and FO as follows:

$$AO=.*(PO\cup FO) \quad (EQ. 3);$$

or $$AO=(.*R_1.*\cap.*R_2)\setminus(R_1.*R_2) \quad (EQ. 4).$$

AO, as given by EQ. 4, recognizes partial overlap and single full overlap between $R_1$ and $R_2$. Additional overlap FSAs, discussed in further detail below, are necessary to handle multiple full overlap.

Once the overlap FSA AO is computed in block 302 of method 300, flow proceeds to block 303, in which it is determined based on the overlap FSA AO(1) whether the regular expression decomposition of $R_1$ and $R_2$ results in false positives due to the presence of overlap between $R_1$ and $R_2$. If the overlap FSA AO is determined to contain no accepting states (i.e., has no positive outputs for any input strings) in block 303 of FIG. 3, there is no overlap between $R_1$ and $R_2$, flow proceeds to block 304, and it is determined that transformation of $R_1$ and $R_2$ is safe, and flow of method 300 ends. However, if it is determined in block 303 that the overlap FSA AO contains accepting states, then the transformation of $R_1$ and $R_2$ is not safe, and additional post-processing must be applied to the transformation of $R_1$ and $R_2$ to deal with the false positives that are indicated by the accepting states of the overlap FSA, and flow then proceeds to block 305 of method 300.

In block 305 of FIG. 3, the existence of multiple full overlap between $R_1$ and $R_2$ is determined. In some situations in which there is full overlap between $R_1$ and $R_2$, there may be multiple occurrences of $R_1$ in $R_2$. These multiple occurrences (OC) may be defined by OC(N), where the strings in OC(N) start with a prefix that is in the language defined by $R_2$, end with a suffix that is in the language defined by $R_1$, and contain N or more occurrences of substrings that are in the language defined by $R_2$. OC(N) may be computed recursively as follows:

$$OC(1)=R_1 \quad (EQ. 5); \text{ and}$$

$$OC(N)=OC(N-1).+(\cup.*R_1) \quad (EQ. 6).$$

AO(N), which is a language that contains the strings that are in the language defined by AO and that contain N or more occurrences of substrings that are in the language defined by $R_1$, may then be computed based on EQ. 6 as follows:

$$AO(N)=(.*OC(N).*\cap.*R_2)\setminus(R_1.*R_2) \quad (EQ. 7).$$

AO(1), as defined by EQ. 7, is equal to AO that was defined by EQ. 4, since $OC(1)=R_1$ based on EQ. (5).

An FSA EO(N) may be calculated based on AO(N). EO(N) defines a language that contains the strings that are in the language defined by $R_2$, and that contain exactly N occurrences of substrings that are in the language defined by $R_1$. EO(N) may be computed as follows:

$$EO(N) = AO(N) \backslash AO(N+1) \qquad (EQ. 8).$$

EQ. (7) and EQ. (8) are used in block 305 of method 300 to iteratively compute multiple full overlap FSAs for $R_1$ and $R_2$ that recognize AO(N+1) and EO(N). The iterations continue until AO(N+1) has zero accepting states or until a termination condition is reached. Table 1 illustrates an example of an algorithm for computation of a set of FSAs EO(N), for N from 1 to $N_{MAX}$, where $N_{MAX}$ is the maximum number of occurrences of $R_1$ that may exist in $R_2$.

TABLE 1

Algorithm for Computation of EO(N), N = 1 to $N_{MAX}$

| | |
|---|---|
| 1: | GenerateOverlaps(R1, R2, Overlap FSAs) |
| 2: | N = 1; |
| 3: | Overlap FSAs = empty set |
| 4: | Compute FSA of AO(1) using Eq. (7); |
| 5: | while (AO(N) has accepting states) and (termination condition is not reached) do |
| 6: | $N_{MAX}$ = N; |
| 7: | Compute FSA of AO(N + 1) using Eq. (7); |
| 8: | Compute FSA of EO(N) using Eq. (8); |
| 9: | Overlap FSAs[N] = FSA of EO(N); |
| 10: | N = N + 1; |
| 11: | end while |
| 12: | if termination condition is not reached then |
| 13: | return Overlap FSAs; |
| 14: | else |
| 15: | return failure; |
| 16: | end if |

The one or more FSAs EO(N), for N from 1 to $N_{MAX}$, that are computed by the algorithm of Table 1 may also be referred to as overlap FSAs EO(1) to EO($N_{MAX}$). Overlap FSAs EO(1) to EO($N_{MAX}$) may be stored and used explicitly to eliminate false positives. The outputs of the overlap FSAs EO(1) to EO($N_{MAX}$) may also be used to activate post-processing functions. Depending on $R_1.*R_2$, there may be any appropriate number of overlap FSAs EO(1) to EO($N_{MAX}$); the number of overlap FSAs is bounded by $N_{MAX}$.

After computation of the one or more multiple overlap FSAs EO(1) to EO($N_{MAX}$) in block 305, flow proceeds to block 306, in which the memory requirements of the overlap FSAs EO(1) to EO($N_{MAX}$) that were determined in block 305 are determined. These memory requirements may exceed the memory requirements of the original regular expression $R_1.*R_2$, in which case the transformation of $R_1.*R_2$ may be impractical. $N_{MAX}$ may be very large (It is possible to have an unbounded $N_{MAX}$) and/or the post-processing functions may be relatively complex. Therefore, the algorithm GenerateOverlaps that was shown in Table 1 has a termination condition that is based on the memory requirements of implementing the false positive elimination technique on a particular post-processor architecture. If the memory requirements of the implementation of overlap FSAs EO (1) to EO($N_{MAX}$) exceeds a predetermined size, it is determined that transformation of the regular expression $R_1.*R_2$ into $R_1$ and $R_2$ is either infeasible or impractical. Flow then proceeds to block 307 of FIG. 3, and the transformation of $R_1.*R_2$ is reverted. However, if it is determined in block 306 that the implementation of overlap FSAs EO(1) to EO($N_{MAX}$) do not exceed the predetermined size, flow proceeds to block 308 of method 300, in which a transformed FSA of $R_1.*R_2$ is constructed comprising an FSA of $R_1$, and FSA of $R_2$, respective overlap FSAs of EO(1) to EO($N_{MAX}$) that are used to eliminate false positives, and a post-processor comprising a counter. This is described in further detail with respect to FIGS. 4-5.

Figure 4:
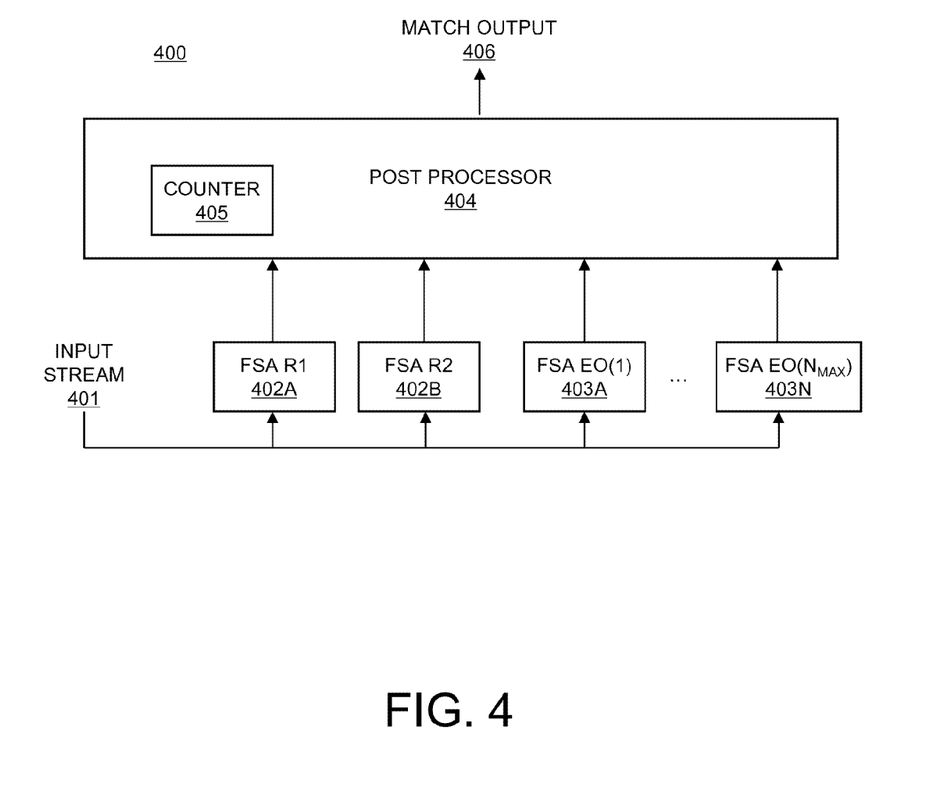
FIG. 4 illustrates an embodiment of a system for handling subexpression overlap for a FSA transformation.

FIG. 4 shows a system 400 for handling subexpression overlap for a FSA transformation. System 400 includes a plurality of parallel FSAs 402A-B and 403A-N that scan an input stream 401 for matches of $R_1.*R_2$. FSAs 402A-B are the decomposed individual FSAs for $R_1$ and $R_2$, respectively, and FSAs 403A-N are the one or more overlap FSAs EO(1) to EO($N_{MAX}$) as were determined by method 300 of FIG. 3. System 400 may include any appropriate number of overlap FSAs 403A-N, subject to the memory constraints discussed above with respect to blocks 306-308. Post-processor 404 receives match notifications from the FSAs 401A-B and 403A-N, maintains counter 405, and determines based on these match notifications and counter 405 whether to report a match of $R_1.*R_2$ in input stream 401 on match output 406. Counter 405 is a counter of instances of $R_1$ that are detected in input stream 401, and is discussed in further detail below with respect to FIG. 5. FIG. 4 is shown for illustrative purposes only; in some embodiments, for example, FSAs 402A-B and 403A-N may be combined in a single FSA that contains multiple accepting states corresponding to the accepting states of the FSAs 402A-B and 403A-N.

Figure 5:
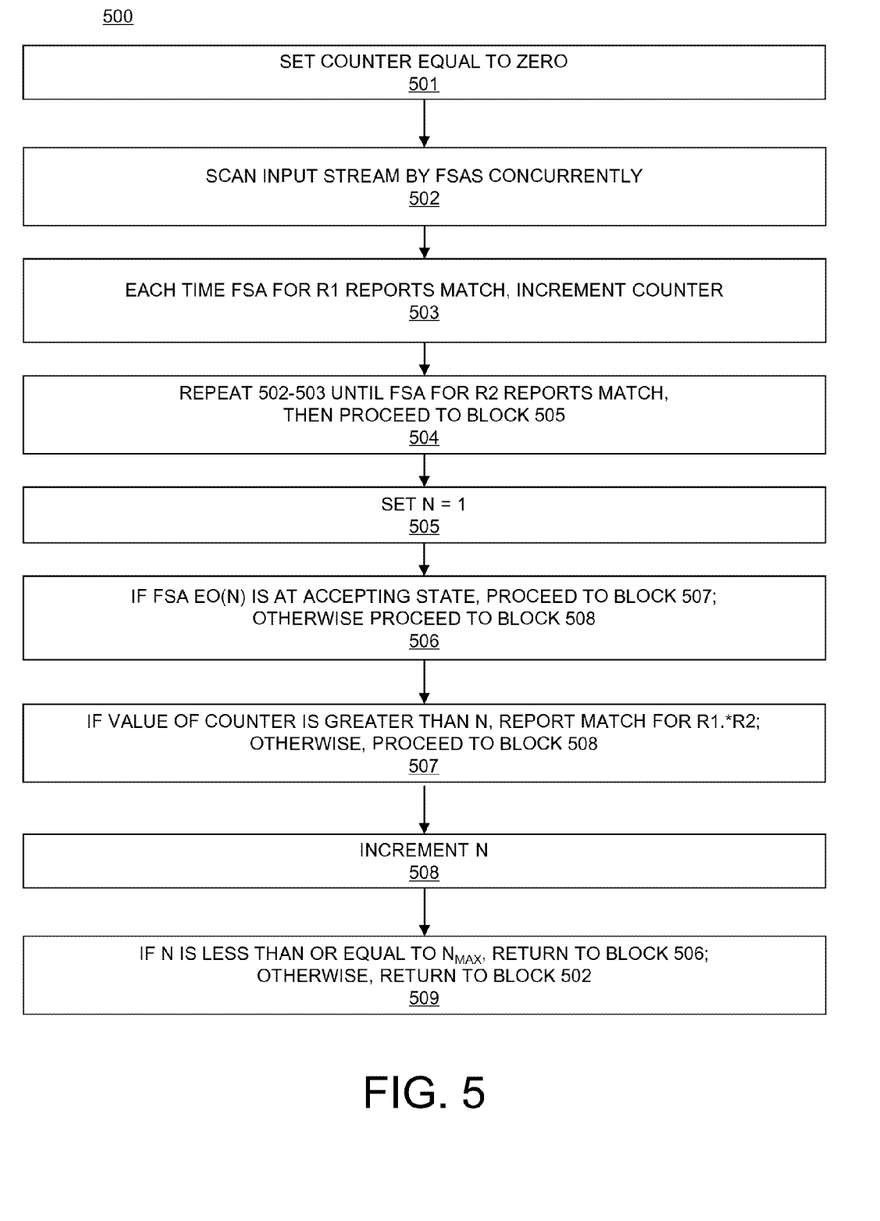
FIG. 5 illustrates a flowchart of an embodiment of a method of handling subexpression overlap for a FSA transformation.

FIG. 5 shows a flowchart of a method 500 of handling overlap between subexpressions that is implemented in the system 400 of FIG. 4. First, in block 501, the counter 405 is set to zero. Then, in block 502, the FSAs 402A-B that recognize $R_1$ and $R_2$, respectively, in addition to the one or more overlap FSAs 403A-N that recognize EO(1) to EO($N_{MAX}$) that were determined by method 300 of FIG. 3, concurrently scan the input stream 401. Next, in block 503, a match for $R_1$ is reported to post-processor 404 by FSA 402A, and counter 405 is incremented by 1. Flow then proceeds to block 504 of FIG. 5, in which blocks 502 and 503 are repeated (i.e., the input stream 401 is scanned, and the counter 405 is incremented for each reported match of $R_1$ from FSA 402A) until a match for $R_2$ is reported by FSA 402B, at which point flow proceeds to block 505 of method 500. In block 505, a variable N is set to 1. This variable N is used to step through overlap FSAs 403A-N for EO(1) to EO($N_{MAX}$). Flow proceeds to block 506, in which it is determined whether overlap FSA EO(N) is at an accepting state (i.e., reporting a match). If, in block 506, it is determined that the overlap FSA EO(N) is at an accepting state, flow proceeds to block 507, in which it is determined whether the value of the counter 405 is greater than the current value of N. If it is determined in block 507 that the counter 405 is greater than the current value of N, a match for $R_1.*R_2$ is reported by post-processor 404 on match output 406, and flow of method 500 ends. Otherwise, if overlap FSA EO(N) is not at an accepting state in block 506, or the value of the counter 405 is not greater than the current value of N in block 507, flow proceeds to block 508, in which N is incremented by 1. Then, in block 509 of method 500, it is determined whether N is less than or equal to $N_{MAX}$. If, in block 509, it is determined that N is less than or equal to $N_{MAX}$, flow returns to block 506 of FIG. 5, so that each of overlap FSAs 403A-N corresponding to EO(1) to EO($N_{MAX}$) may be evaluated in blocks 506 and 507 of method 500. If, however, it is determined in block 508 that N is greater than $N_{MAX}$ in block 509, flow returns to block 502 of method 500, and the input stream 401 continues to be scanned by the FSAs 402A-B and 403A-N.

Another example of an algorithm that detects and eliminates false positives due to overlap is described in Table 2. Note that, in Table 2, on the accepting states of the FSA that recognizes $R_1$ the counter is incremented, and on the accepting states of the FSA that recognizes $R_2$, the value of the counter is tested. A match for $R_1.*R_2$ is indicated if $R_1$ is matched more than N times when EO(N) is matched. As a result, on the accepting states of the FSA that recognizes EO(N), a match is reported only if the value of the counter is larger than N. In Table 2, input data is read from the input stream "is", and offsets of the computed matches are written into the output stream "match offsets". The "Overlap FSAs" referenced in Table 2 may be computed using the algorithm of Table 1.

TABLE 2

Algorithm for Computation of Match
Results while Suppressing False Positives

```
1:  ComputeMatchResults(input stream is, output stream match offsets)
2:  counter = 0;
3:  current offset = 0;
4:  while cur input = get next input from input stream(is) do
5:      Compute next state for all FSAs using cur input
6:      if the FSA of R₁ is at an accepting state then
7:          counter = counter + 1;
8:      end if
9:      regex match = false;
10:     overlap match = false;
11:     N = 1
12:     while N < N_MAX do
13:         if Overlap FSAs[N] is at an accepting state then
14:             overlap match = true;
15:             if counter > N then
16:                 regex match = true;
17:             end if
18:         end if
19:         N = N + 1;
20:     end while
21:     if not overlap match then
22:         if (FSA of R₂ is at an accepting state) and
                (counter > 0) then
23:             regex match = true;
24:         end if
25:     end if
26:     if regex match then
27:         match offsets.insert(current offset);
28:     end if
29:     current offset = current offset + 1;
30: end while
```

In an example of application of the embodiments of methods of FIGS. 3 and 5 and Tables 1-2, for a regular expression "abc.*xabcy", where $R_1$="abc" and $R_2$="xabcy", $N_{MAX}$ is equal to 1. The overlap FSAs implementing AO(1) and EO(1) are equal and recognize the subexpression "xabcy". Whenever "xabcy" is matched in the input stream, a false positive will be detected by EO(1) if "abc" has been so far matched only once, as indicated by the counter. For the original regular expression "abc.*xabcy" to produce a match, the subexpression "abc" must have been matched at least twice; i.e., the value of the counter must be greater than 1, when the FSA for $R_2$ reports a match.

In an additional example, the regular expression to be matched is "abc.*x(abc){0,2}", where "abc" may occur in "x(abc){0,2}y" from zero to two times (i.e., $N_{MAX}$ is equal to 2). The FSA implementing EO(1) recognizes "xabcy", and the FSA implementing EO(2) would recognize "xabcabcy". The FSA implementing EO(1) would detect a false positive if "abc" has been so far matched only once, as indicated by the counter, and the FSA implementing EO(2) would detect a false positive if "abc" has been so far matched only twice, as indicated by the counter. In another example, the regular expression to be matched is "abc.*(abc){1,2}". In this case, the FSA of EO(1) recognizes "abc", and the FSA of EO(2) recognizes "abcabc". Given the input string "abcabc", EO(2) will detect a false positive, whereas EO(1) will find a valid match. In such a case, a match for the original regular expression "abc.*(abc){1,2}" will be reported and false positives detected by other overlaps will be ignored.

Embodiments of methods of FIGS. 3 and 5 and Tables 1-2 may be extended to cover regular expressions that contain an arbitrary number of subexpressions separated by .*, e.g., $R_1.*R_2.* \ldots .*R_K$. In such cases, the methods described in Tables 1-2 and FIGS. 3 and 5 may be iteratively applied to $R_1.*R_2, R_2.*R_3, \ldots, R_I.*R_{I+1}, \ldots,$ and $R_{K-1}.*R_K$. As long as the algorithm of Table 1 does not return a failure (i.e., termination condition) for any of the $R_I, R_{I+1}$ pairs, for I from 1 to K-1, the decomposition of the original regular expression $R_1.*R_2.* \ldots .*R_K$ into $R_1, R_2, \ldots, R_K$ may be carried out while being able to detect and eliminate all false positives. However, if the algorithm of Table 1 returns a failure for a $R_J$, $R_{J+1}$ pair, the transformations for all $R_J, R_{J+1}$ pairs, for J from 1 to I, must be reverted to preserve correctness. Embodiments of methods of FIGS. 3 and 5 and Tables 1-2 may also be extended to cover regular expression decompositions that involve repetitions of large character classes, e.g., $R_1[^\backslash n]\{5,15\}R_2$, where $[^\backslash n]\{5,15\}$ is the separator; however, the methods for handling such cases are more complex, but still build upon the techniques we have described in this work.

Figure 6:
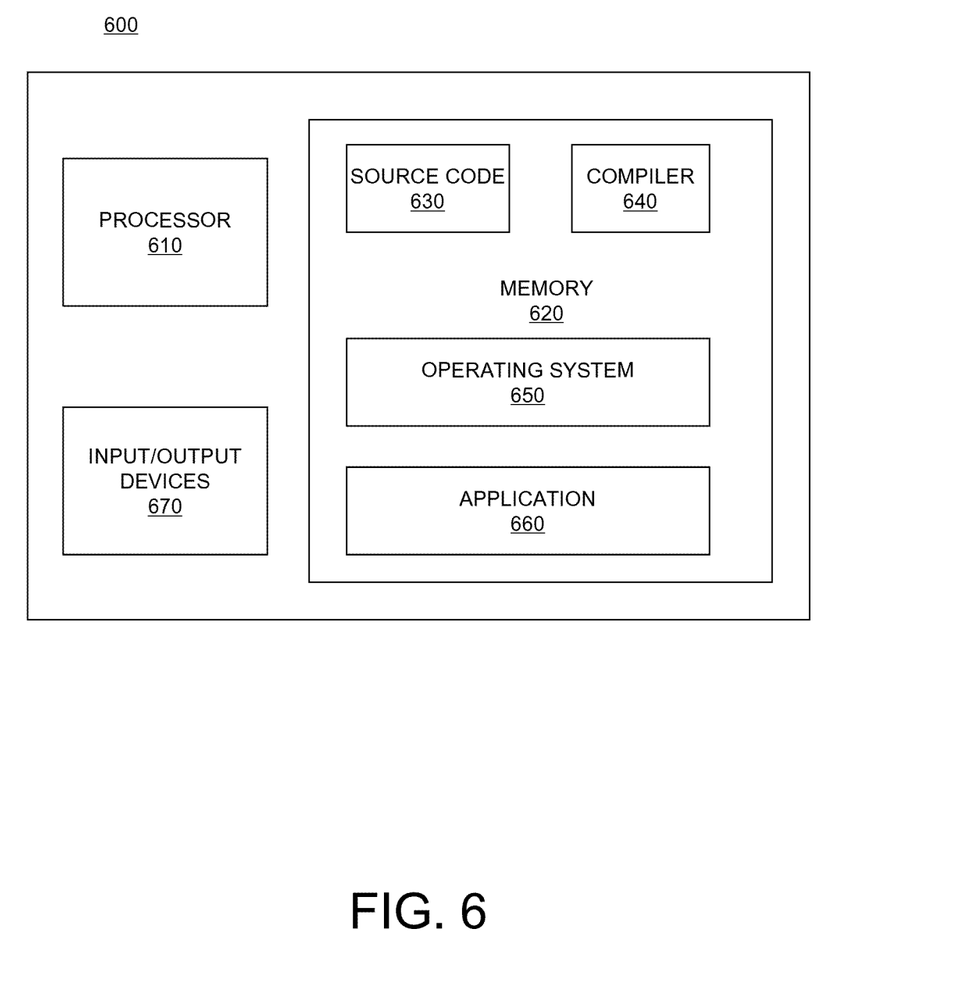
FIG. 6 is a schematic block diagram illustrating an embodiment of a computer that may be used in conjunction with a method for determination and handling of subexpression overlap for a FSA transformation.

FIG. 6 illustrates an example of a computer 600 which may be utilized by exemplary embodiments of a method for determining and handling subexpression overlap for FSA transformations as embodied in software. Various operations discussed above may utilize the capabilities of the computer 600. One or more of the capabilities of the computer 600 may be incorporated in any element, module, application, and/or component discussed herein.

The computer 600 includes, but is not limited to, PCs, workstations, laptops, PDAs, palm devices, servers, storages, and the like. Generally, in terms of hardware architecture, the computer 600 may include one or more processors 610, memory 620, and one or more input and/or output (I/O) devices 670 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 610 is a hardware device for executing software that can be stored in the memory 620. The processor 610 can be virtually any custom made or commercially available processor, a central processing unit (CPU), a digital signal processor (DSP), or an auxiliary processor among several processors associated with the computer 600, and the processor 610 may be a semiconductor based microprocessor (in the form of a microchip) or a macroprocessor.

The memory 620 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 620 may incorporate electronic, magnetic, optical, and/or other types of storage media. Note that the memory 620 can have a distributed architecture, where various components are situated remote from one another, but can be accessed by the processor 610.

The software in the memory 620 may include one or more separate programs, each of which comprises an ordered listing of executable instructions for implementing logical functions. The software in the memory 620 includes a suitable operating system (O/S) 650, compiler 640, source code 630, and one or more applications 660 in accordance with exemplary embodiments. As illustrated, the application 660 comprises numerous functional components for implementing the features and operations of the exemplary embodiments. The application 660 of the computer 600 may represent various applications, computational units, logic, functional units, processes, operations, virtual entities, and/or modules in accordance with exemplary embodiments, but the application 660 is not meant to be a limitation.

The operating system 650 controls the execution of other computer programs, and provides scheduling, input-output control, file and data management, memory management, and communication control and related services. It is contemplated by the inventors that the application 660 for implementing exemplary embodiments may be applicable on all commercially available operating systems.

Application 660 may be a source program, executable program (object code), script, or any other entity comprising a set of instructions to be performed. When a source program, then the program is usually translated via a compiler (such as the compiler 640), assembler, interpreter, or the like, which may or may not be included within the memory 620, so as to operate properly in connection with the O/S 650. Furthermore, the application 660 can be written as an object oriented programming language, which has classes of data and methods, or a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 670 may include input devices such as, for example but not limited to, a mouse, keyboard, scanner, microphone, camera, etc. Furthermore, the I/O devices 670 may also include output devices, for example but not limited to a printer, display, etc. Finally, the I/O devices 670 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 670 also include components for communicating over various networks, such as the Internet or intranet.

If the computer 600 is a PC, workstation, intelligent device or the like, the software in the memory 620 may further include a basic input output system (BIOS) (omitted for simplicity). The BIOS is a set of essential software routines that initialize and test hardware at startup, start the O/S 650, and support the transfer of data among the hardware devices. The BIOS is stored in some type of read-only-memory, such as ROM, PROM, EPROM, EEPROM or the like, so that the BIOS can be executed when the computer 600 is activated.

When the computer 600 is in operation, the processor 610 is configured to execute software stored within the memory 620, to communicate data to and from the memory 620, and to generally control operations of the computer 600 pursuant to the software. The application 660 and the O/S 650 are read, in whole or in part, by the processor 610, perhaps buffered within the processor 610, and then executed.

When the application 660 is implemented in software it should be noted that the application 660 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 660 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 660 is implemented in hardware, the application 660 can be implemented with any one or a combination of the following technologies, which are well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The technical effects and benefits of exemplary embodiments include automatic determination and handling of subexpression overlap for FSA transformations.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A computer program product comprising a non-transitory computer readable storage medium containing computer code that, when executed by a computer, implements a method for transforming a finite state automaton (FSA) of a regular expression, wherein the method comprises:
   determining a first subexpression $R_1$ and a second subexpression $R_2$ in the regular expression;
   calculating an overlap FSA, the overlap FSA configured to determine the existence of a partial overlap or a full overlap between the first subexpression $R_1$ and the second subexpression $R_2$;
   determining whether the overlap FSA has an accepting state; and
   in the event the overlap FSA is determined not to have an accepting state, determining that the transformation of the regular expression is safe, and constructing a transformed FSA of the regular expression comprising a first FSA for the first subexpression $R_1$ and a second FSA for the second subexpression $R_2$.

2. The computer program product according to claim 1, wherein the overlap FSA is given by:

$$(.*R_1.* \cap .*R_2) \backslash (R_1.*R_2).$$

3. The computer program product according to claim 1, further comprising in the event the overlap FSA is determined to have an accepting state, determining that the transformation of the regular expression is not safe.

4. The computer program product according to claim 1, further comprising in the event the overlap FSA is determined to have an accepting state, calculating one or more overlap FSAs, the one or more overlap FSAs configured to determine the existence of multiple full overlap between the first subexpression $R_1$ and the second subexpression $R_2$.

5. The computer program product according to claim 4, wherein the number of one or more overlap FSAs is equal to a maximum number $N_{MAX}$ of occurrences of first subexpression $R_1$ in second subexpression $R_2$, and wherein each of the one or more overlap FSAs is configured to detect a false positive result corresponding to a respective number N, from 1 to $N_{MAX}$, of occurrences of first subexpression $R_1$ in second subexpression $R_2$.

6. The computer program product according to claim 5, further comprising:
   setting a value of a counter in a post-processor to zero;
   scanning an input stream by the first FSA, the second FSA, and the one or more overlap FSAs;
   incrementing the counter whenever a match is reported by the first FSA to the post-processor; and
   in the event a match is reported by the second FSA to the post-processor:
      determining whether a particular FSA of the one or more overlap FSAs is at an accepting state, and in the event the particular FSA is at an accepting state:
         determining whether the value of the counter is greater than or equal to a value of N associated with the particular FSA, and in the event the value of the counter is greater than or equal to N, reporting a match for the regular expression in the input stream by the post-processor.

7. The computer program product according to claim 4, further comprising determining whether the one or more overlap FSAs have memory requirements that are greater than a predetermined threshold, and in the event the one or more overlap FSAs are determined to have memory requirements that are greater than the predetermined threshold, constructing an untransformed FSA of the regular expression.

8. A computer system for transforming a finite state automaton (FSA) of a regular expression, the computer system configured to:
   determine, by a processor of the computer system, a first subexpression $R_1$ and a second subexpression $R_2$ in the regular expression;
   calculate an overlap FSA, the overlap FSA configured to determine the existence of a partial overlap or a full overlap between the first subexpression $R_1$ and the second subexpression $R_2$;
   determine whether the overlap FSA has an accepting state; and
   in the event the overlap FSA is determined not to have an accepting state, determine that the transformation of the regular expression is safe, and construct a transformed FSA of the regular expression comprising a first FSA for the first subexpression $R_1$ and a second FSA for the second subexpression $R_2$.

9. The computer system of claim 8, wherein the overlap FSA is given by:

$$(.*R_1.* \cap .*R_2) \backslash (R_1.*R_2).$$

10. The computer system of claim 8, wherein the computer system is further configured to, in the event the overlap FSA is determined to have an accepting state, determine that the transformation of the regular expression is not safe.

11. The computer system of claim 10, wherein the computer system is further configured to, in the event the overlap FSA is determined to have an accepting state, calculate one or more overlap FSAs, the one or more overlap FSAs configured to determine the existence of multiple full overlap between the first subexpression $R_1$ and the second subexpression $R_2$.

12. The computer system of claim 11, wherein the number of one or more overlap FSAs is equal to a maximum number $N_{MAX}$ of occurrences of first subexpression $R_1$ in second subexpression $R_2$, and wherein each of the one or more overlap FSAs is configured to detect a false positive result corresponding to a respective number N, from 1 to $N_{MAX}$, of occurrences of first subexpression $R_1$ in second subexpression $R_2$.

13. The computer system of claim 12, wherein the computer system comprises a post-processor and a counter, and wherein the computer system is further configured to:
   set a value of the counter to zero;
   scan an input stream by the first FSA, the second FSA, and the one or more overlap FSAs;
   increment the counter whenever a match is reported by the first FSA to the post-processor; and
   in the event a match is reported by the second FSA to the post-processor:
      determine whether a particular FSA of the one or more overlap FSAs is at an accepting state, and in the event the particular FSA is at an accepting state:
         determine whether the value of the counter is greater than or equal to a value of N associated with the particular FSA, and in the event the value of the counter is greater than or equal to N, report a match for the regular expression in the input stream by the post-processor.

14. The computer system according to claim 11, further comprising determining whether the one or more overlap FSAs have memory requirements that are greater than a predetermined threshold, and in the event the one or more overlap FSAs are determined to have memory requirements that are greater than the predetermined threshold, constructing an untransformed FSA of the regular expression.

15. A computer-implemented method for transforming a finite state automaton (FSA) of a regular expression, the method comprising:
determining, by a computer, a first subexpression $R_1$ and a second subexpression $R_2$ in the regular expression;
calculating an overlap FSA, the overlap FSA configured to determine the existence of a partial overlap or a full overlap between the first subexpression $R_1$ and the second subexpression $R_2$;
determining whether the overlap FSA has an accepting state; and
in the event the overlap FSA is determined not to have an accepting state, determining that the transformation of the regular expression is safe, and constructing a transformed FSA of the regular expression comprising a first FSA for the first subexpression $R_1$ and a second FSA for the second subexpression $R_2$.

16. The method of claim 15, wherein the overlap FSA is given by:

$$(.*R_1.*\cap .*R_2)\backslash (R_1.*R_2).$$

17. The method of claim 15, further comprising in the event the overlap FSA is determined to have an accepting state, determining that the transformation of the regular expression is not safe.

18. The method of claim 15, further comprising in the event the overlap FSA is determined to have an accepting state, calculating one or more overlap FSAs, the one or more overlap FSAs configured to determine the existence of multiple full overlap between the first subexpression $R_1$ and the second subexpression $R_2$.

19. The method of claim 18, wherein the number of one or more overlap FSAs is equal to a maximum number $N_{MAX}$ of occurrences of first subexpression $R_1$ in second subexpression $R_2$, and wherein each of the one or more overlap FSAs is configured to detect a false positive result corresponding to a respective number N, from 1 to $N_{MAX}$, of occurrences of first subexpression $R_1$ in second subexpression $R_2$.

20. The method of claim 18, further comprising determining whether the one or more overlap FSAs have memory requirements that are greater than a predetermined threshold, and in the event the one or more overlap FSAs are determined to have memory requirements that are greater than the predetermined threshold, constructing an untransformed FSA of the regular expression.

* * * * *